Feb. 22, 1938.                L. J. BAZZONI                2,108,842
                           SELF CLINCHING RIVET
                            Filed June 5, 1936
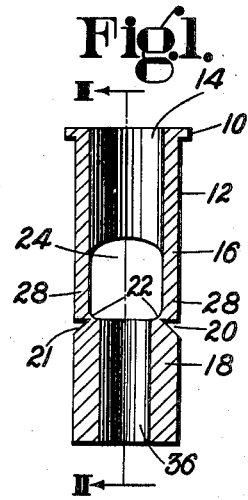
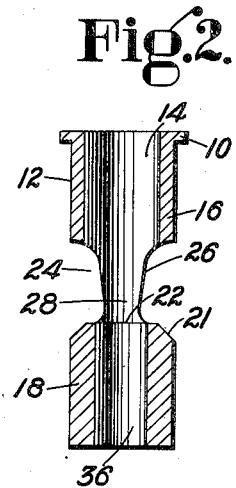
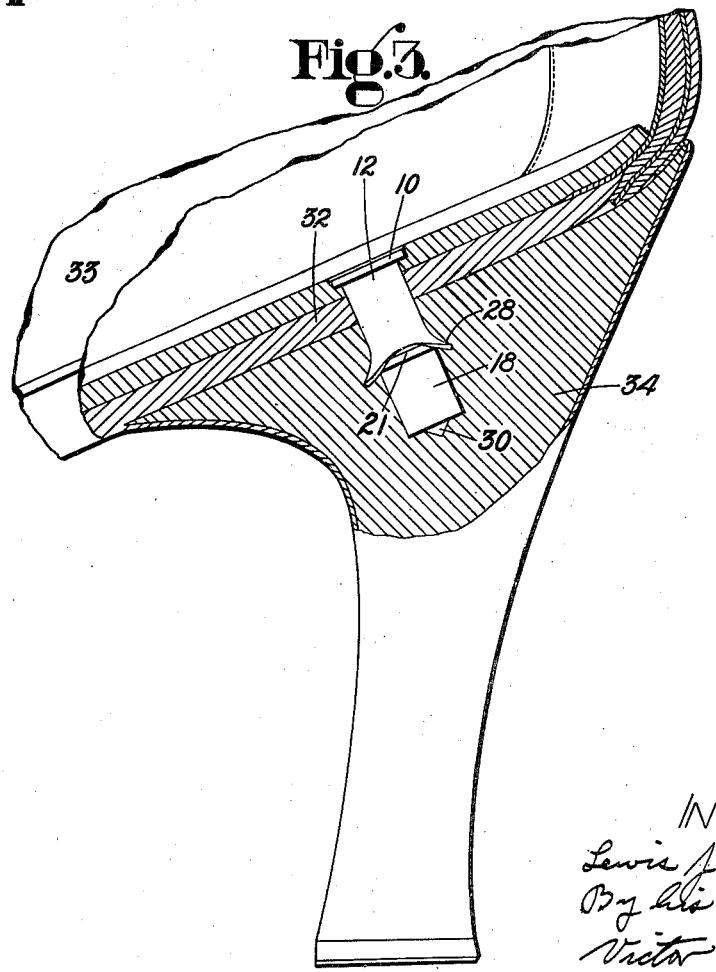
INVENTOR
Lewis J. Bazzoni
By his attorney
Victor Cobb Patented Feb. 22, 1938

2,108,842

UNITED STATES PATENT OFFICE 2,108,842

SELF-CLINCHING RIVET

Lewis J. Bazzoni, Swampscott, Mass., assignor to United Shoe Machinery Corporation, Paterson, N. J., a corporation of New Jersey Application June 5, 1936, Serial No. 83,725

2 Claims. (Cl. 85—40)

This invention relates to self-clinching rivets. Such devices are broadly very common and consist of an anvil or point deflecting member and a separate nail or fastening member adapted to cooperate with the anvil. The article is utilized by inserting the anvil in a previously prepared hole in the work and then driving in the fastening member above the anvil, the point or points of the fastening member being deflected when they strike the anvil.

While such devices, when properly made and used, may be mechanically successful, they are subject to the objection that each device consists of two separate parts which have to be handled separately and correctly located, and that each part is useless if the other chances to get mislaid.

It is an important object of the present invention to provide a practical one-piece article of the class discussed, in which the fastening member and the anvil are formed from one piece of metal and are not separated from each other until the driving blow is given to set them permanently in the work.

Accordingly I have provided a self-clinching rivet having a head, a shank and an anvil all integrally formed from one piece of stock, the shank being slotted to provide a plurality of tongues integral with the anvil at their outer ends which will be upset when the anvil is seated at the bottom of a hole in the work and the head is struck a sharp blow. The tongues will preferably be tapered toward the anvil to facilitate such action.

In accordance with another feature of the invention I have provided a groove around the rivet at the junction of the shank and anvil member to reduce the thickness of the junction between the tongues and the anvil and thus to provide frangible webs to facilitate the breaking of the tongues from the anvil under the driving blow. This groove is advantageously formed in a V-shape, with one of the sides of the V sloping inwardly and toward the head of the rivet, in order to deflect the broken-off ends of the tongues outward.

These and other features of the invention comprising certain combinations and arrangements of parts will be apparent from the following description of a preferred embodiment of the invention shown in the drawings, in which Fig. 1 is a longitudinal cross-section of the rivet looking in the direction of the planes of the clinching tongues;

Fig. 2 is a cross-section on the line II—II of Fig. 1; and

Fig. 3 illustrates the application of the device to the attachment of wood heels to shoes.

The rivet illustrated consists of a head 10 and a shank 12 formed as a tube by virtue of the bore 14, the wall 16 of the shank 12 being of small thickness relatively to its diameter. The integral anvil portion 18 is of the same outside diameter as the shank 12 and is separated from it by an annular groove 20 the lower face 21 of which is conical and slopes outwardly and away from the head 10 at a considerable angle. The deepest part of the groove 20 is preferably of somewhat smaller diameter than the bore 14 so that the inner face of the wall 16 overhangs the groove 20 to a slight degree. The groove 20 does not, however, cut through the wall 16, so that a thin web 22 connects the shank 12 and the anvil 18.

The shank 12 is slotted from the groove 20 toward the head 10 by a plurality of cuts. As illustrated, the slots 24 are two in number and are formed by two lateral cuts, as at 26, leaving only two tongues or legs 28 from the wall 16 in this locality. The tongues 28 are shown as considerably narrower than the cuts 26, as tapering toward the anvil 18, and are connected to the anvil by the thin webs 22 at their outer ends.

The device is used as shown in Fig. 3, which illustrates the attaching of a wood heel to a shoe. A hole 30 is bored through the bottom 32 of the shoe 33 into the already located heel 34, which may be temporarily held in place by cement, the hole being an easy fit for the shank 12 and anvil 18 and of such depth as to leave the head 10 projecting for some distance into the interior of the shoe when the anvil 18 is seated on the bottom of the hole. Pressure or a sharp blow on the head 10 will break the webs 22, and the ends of the tongues 28 will slide down the conical surface 21 and will thereby be forced to spread and curl into the adjacent wood of the heel 34. This fastens the heel so firmly in place that it is impossible to pull it off without destroying the heel or the shoe. If necessary, the head 10 may be cut away by an end mill, and the heel then withdrawn.

The anvil 18 is illustrated as tubular, having a bore 36. This bore when present should preferably be of smaller diameter than the bore 14 to provide for sufficient undercutting in the groove 20 and to stiffen the upper edge of the anvil member 18. This bore 36, when present, has the advantage of reducing the weight of the rivet, and of permitting its location on a pin in the work, if desired.

The rivet of the present invention can be easily made, in quantity, upon an automatic screw machine.

Having described my invention, what I claim as new and desire to secure by Letters Patent of the United States is:

1. A self-clinching rivet comprising a tubular shank having a head end and having at the end opposite thereto an integral extension to serve as an anvil, the wall of said shank having a plurality of circumferentially spaced openings extending from said anvil toward the head end of the shank and which divide the shank into a plurality of longitudinal tongues each of which at one end is joined to the anvil and all of which at a locality between the anvil and the head end of the shank are joined to each other, the junction between the tongues and the anvil being considerably reduced in thickness by a deep V-shaped groove to provide frangible webs, one of the walls of said groove sloping outwardly and from the head end to direct the tongues outwardly when the webs are broken by force applied to the head end of the shank, thereby enabling said tongues to serve as prongs.

2. A self-clinching rivet comprising a tubular shank having a head end and having at the end opposite thereto an integral cylindrical extension to serve as an anvil, the wall of said shank being continuous at a locality adjacent to the head end and having a plurality of circumferentially spaced openings extending from said continuous portion to said anvil, which openings are shaped to divide the shank into a plurality of longitudinal tongues extending from said continuous portion of the shank wall to said anvil, each of said tongues being joined to said anvil and each tapering from a relatively greater width adjacent to said continuous portion of the shank wall to a relatively less width at its junction with the anvil, said anvil at the locality of the junction of the tongues having a conical wall sloping outwardly and away from the head end of the shank at a considerable angle to the axis of the rivet, which wall nearly separates the tongues from the anvil at the junction of the tongues with the anvil to insure frangibility, said wall serving also by reason of the angle of its slope to form said tongues into outwardly extending prongs upon a driving blow on said head end of said shank.

LEWIS J. BAZZONI.